United States Patent
Tomioka

(10) Patent No.: US 9,354,435 B2
(45) Date of Patent: May 31, 2016

(54) PROTECTION DEVICE AND MICROSCOPE SYSTEM

(71) Applicant: OLYMPUS CORPORATION, Shibuya-ku, Tokyo (JP)

(72) Inventor: Masaharu Tomioka, Higashiyamato (JP)

(73) Assignee: OLYMPUS CORPORATION, Tokyo (JP)

( * ) Notice: Subject to any disclaimer, the term of this patent is extended or adjusted under 35 U.S.C. 154(b) by 123 days.

(21) Appl. No.: 14/098,381

(22) Filed: Dec. 5, 2013

(65) Prior Publication Data

US 2014/0160560 A1 Jun. 12, 2014

(30) Foreign Application Priority Data

Dec. 12, 2012 (JP) .................. 2012-271715

(51) Int. Cl.
*G02B 21/06* (2006.01)

(52) U.S. Cl.
CPC ...................... *G02B 21/06* (2013.01)

(58) Field of Classification Search
CPC ........................................ G02B 21/06
USPC .......................................... 359/388
See application file for complete search history.

(56) References Cited

U.S. PATENT DOCUMENTS 2,764,672 A * 9/1956 Koedderich et al. .......... 362/190
5,524,163 A * 6/1996 Kobayashi et al. ............. 385/96
6,594,075 B1 * 7/2003 Kanao et al. .................. 359/385
2006/0012875 A1 * 1/2006 Wolleschensky ............. 359/388
2006/0257886 A1 * 11/2006 Kobayashi et al. ............... 435/6

FOREIGN PATENT DOCUMENTS

JP 2006-011045 A 1/2006
JP 2011128565 A * 6/2011

OTHER PUBLICATIONS

Machine translation of JP2011-128565 A from https://www4.j-platpat.inpit.go.jp/cgi-bin/tran_web_cgi_ejje?u=http://www4.j-platpat.inpit.go.jp/eng/translation/201506300218418389297956244747467F310AEDECB08293148A4766D38331CC7 on Jun. 29, 2015.*

* cited by examiner

*Primary Examiner* — Frank Font
(74) *Attorney, Agent, or Firm* — Holtz, Holtz & Volek PC

(57) ABSTRACT

Provided is a protection device including a cover member that is disposed on a stage of a microscope main unit, which is provided with a shutter that can block the entry of laser light into an objective lens from a total-reflection illumination optical system, so as to cover a specimen, and that can be opened and closed; and an open/close sensor that detects open and closed states of the cover member and that outputs a drive signal that causes the shutter to block the laser light when the cover member is detected to be in the open state, wherein the cover member has an opening at, in the closed state, a position away from a track along an optical path of the laser light that has been focused by the total-reflection illumination optical system and that has passed through the specimen.

5 Claims, 4 Drawing Sheets

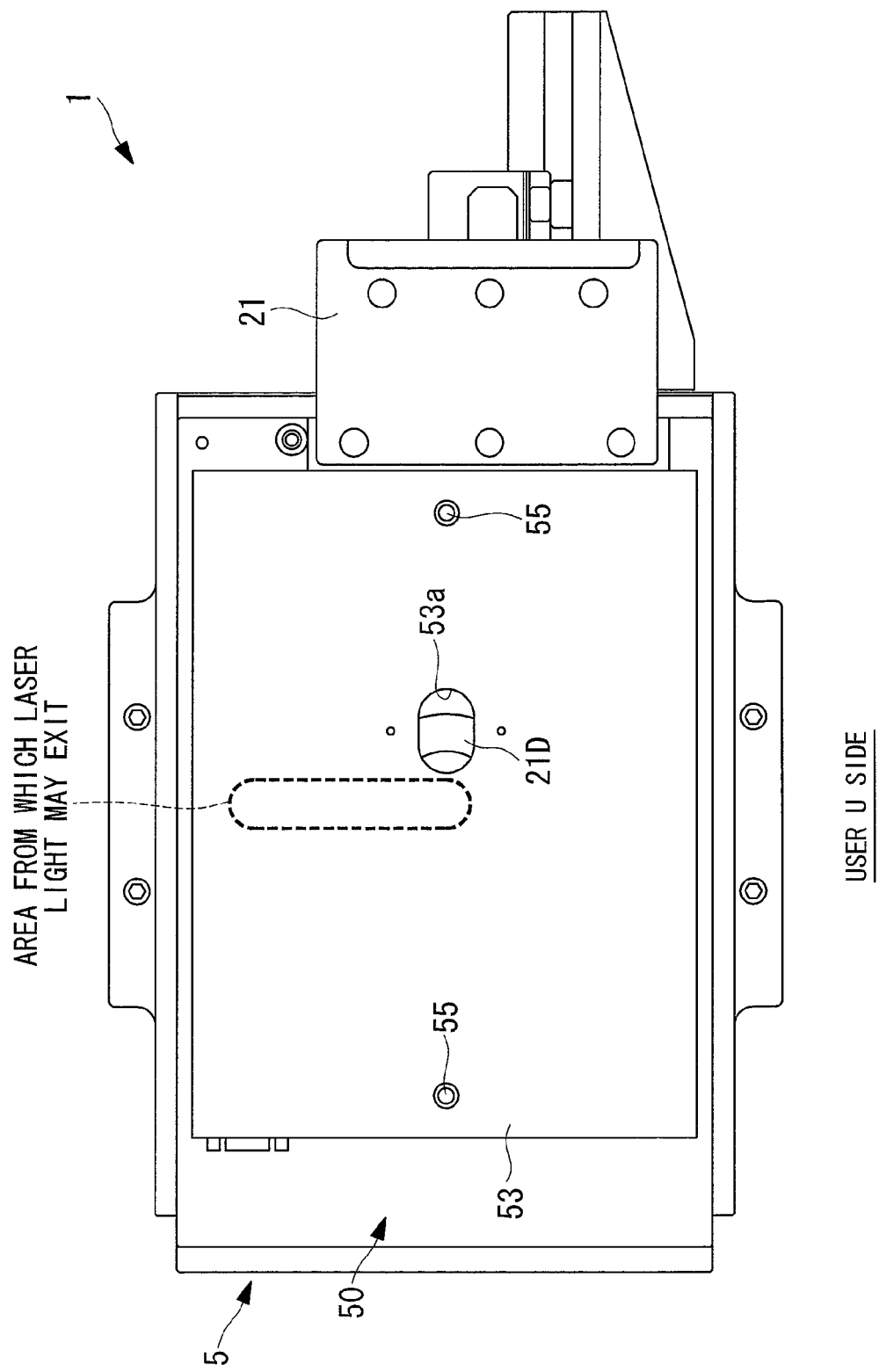

PROTECTION DEVICE AND MICROSCOPE SYSTEM

TECHNICAL FIELD

This application is based on Japanese Patent Application No. 2012-271715, the contents of which are incorporated herein by reference.

The present invention relates to a protection device and a microscope system.

BACKGROUND ART

In the related art, there is a known total-reflection microscope provided with a light source that emits laser light and a protection device having a cover that covers a stage to prevent the laser light from escaping (for example, see Patent Literature 1). In the total-reflection microscope disclosed in Patent Literature 1, the cover of the protection device is provided with a lid that can be opened and closed, and, when the lid is opened to change a specimen, a shutter or the like that functions in conjunction with an interlock switch is operated so as to block the introduction of laser light onto the specimen.

CITATION LIST

Patent Literature

{PTL 1} Japanese Unexamined Patent Application, Publication No. 2006-11045

SUMMARY OF INVENTION

Technical Problem

With the total-reflection microscope disclosed in Patent Literature 1, because the laser light is blocked when the above-described lid of the cover of the protection device is opened, it is not possible to access the specimen by opening the lid of the cover of the protection device during observation with total-reflection illumination. Because of this, with the total-reflection microscope disclosed in Patent Literature 1, it is not possible to apply procedures such as reagent stimulation or the like, which requires access to the specimen, during observation with total-reflection illumination in which the stage is covered with the cover of the protection device.

The present invention provides a protection device, and a microscope system provided with the same, with which it is possible to perform procedures such as reagent stimulation or the like during observation with total-reflection illumination while preventing laser light from escaping.

Solution to Problem

A first aspect of the present invention is a protection device that is attached to a total-reflection illumination microscope provided with a total-reflection illumination optical system, which focuses laser light off-axis at an entrance pupil position of an objective lens facing a specimen on a stage with the stage positioned therebetween, thus making evanescent light enter the specimen via the objective lens, and a blocking portion, which can block the entry of the laser light into the objective lens from the total-reflection illumination optical system, and that prevents the laser light, which has been focused by the total-reflection illumination optical system and which has passed through the specimen, from escaping, the protection device including a cover member that is disposed on the stage so as to cover the specimen and that can be opened and closed; and an open/close sensor that detects open and closed states of the cover member and that outputs a drive signal that causes the blocking portion to block the laser light when the cover member is detected to be in the open state, wherein the cover member has an opening at, in the closed state, a position away from a track along an optical path of the laser light that has been focused by the total-reflection illumination optical system and that has passed through the specimen.

With the above-described first aspect of the present invention, by attaching the cover member to the total-reflection illumination microscope, the laser light that has been focused by the total-reflection illumination optical system of a total-reflection illumination microscope and that has passed through the specimen can be prevented from escaping by using the cover member. Then, when the open/close sensor detects that the cover member is in the closed state, the laser light is allowed to enter the objective lens via the total-reflection illumination optical system of the total-reflection microscope. Therefore, by focusing the laser light off-axis at the entrance pupil position of the objective lens by means of the total-reflection illumination optical system, because total reflection occurs at the specimen and evanescent light enters the specimen, it is possible to perform observation with total-reflection illumination. On the other hand, when the open/close sensor detects that the cover member is in the open state, the entry of the laser light into the objective lens via the total-reflection illumination optical system of the total-reflection microscope is blocked by the blocking portion. Therefore, it is possible to prevent the laser light from escaping to the outside even if the cover member is removed during the observation with total-reflection illumination.

In this case, because the cover member has the opening at, in the closed state, the position away from the track along the optical path of the laser light that has been focused by the total-reflection illumination optical system and that has passed through the specimen, it is possible to access the specimen from outside the cover member via the opening during observation with total-reflection illumination, that is to say, while the cover member is closed.

In addition, in a preparation stage of observation with total-reflection illumination, although most of the laser light introduced onto the specimen from the objective lens ends up passing through the specimen until a state of total-reflection illumination is achieved, because the opening of the cover member is not disposed in the track of that laser light, it is possible to prevent the laser light from exiting to the exterior of the cover member.

Therefore, it is possible to perform procedures such as reagent stimulation or the like by placing a pipette or the like close to the specimen during observation with total-reflection illumination while preventing the laser light from escaping.

In the above-described first aspect, when the cover member is in the closed state, the opening may be disposed at a position away from an observation optical axis at least by a distance that satisfies the expression below in a direction that intersects a track along an optical path of the laser light when the optical axis of the laser light is tilted in order to make the evanescent light enter the specimen by means of the total-reflection illumination optical system: (area that can be illuminated with laser light)/2.

The above-described "area that can be illuminated with laser light", that is to say, the length in the direction that intersects the track along the optical path of the laser light, is equal to, for example, "(movement amount of the stage)+ (beam diameter of laser light to be radiated)" in the case in which a region to be irradiated with the laser light is adjusted by moving the stage. However, because the area in which the laser light can be radiated onto the specimen is restricted by the shapes of members disposed between the objective lens and the specimen, such as a stage insert, the bottom portion of a dish, and so forth, the "stage movement amount (movement amount allowed for adjusting the irradiation region)" is a movement amount that takes account of this restriction.

In the above-described first aspect, the cover member may be provided with a closing member that closes the opening and that can be opened and closed.

By employing such a configuration, it is possible to prevent external light from entering the interior of the cover member by closing the opening of the cover member by using the closing member. Therefore, by closing the opening by using the closing member except for when accessing the specimen via the opening of the cover member, the interior of the cover member can be kept dark, thus facilitating observation of the specimen.

A second aspect of the present invention is a microscope system including a microscope main unit provided with a stage on which a specimen is placed, an objective lens that faces the specimen on the stage with the stage positioned therebetween, a total-reflection illumination optical system that focuses laser light off-axis at an entrance pupil position of the objective lens, thus making evanescent light enter the specimen, and a blocking portion that can block the entry of the laser light into the objective lens from the total-reflection illumination optical system; and any one of the protection devices described above, which is attached to the microscope main unit.

With the above-described second aspect of the present invention, it is possible to perform reagent stimulation or the like on the specimen during observation with total-reflection illumination while preventing the laser light from escaping by using the protection device.

Advantageous Effects of Invention

The present invention affords an advantage in that it is possible to perform procedures such as reagent stimulation or the like during observation with total-reflection illumination while preventing laser light from escaping.

BRIEF DESCRIPTION OF DRAWINGS

FIG. 4 is a plan view in which the microscope system in FIG. 1 is viewed from the protection device side along the optical axis direction of the objective lens in a state in which the cover member of the protection device is closed.

DESCRIPTION OF EMBODIMENT

Figure 1:
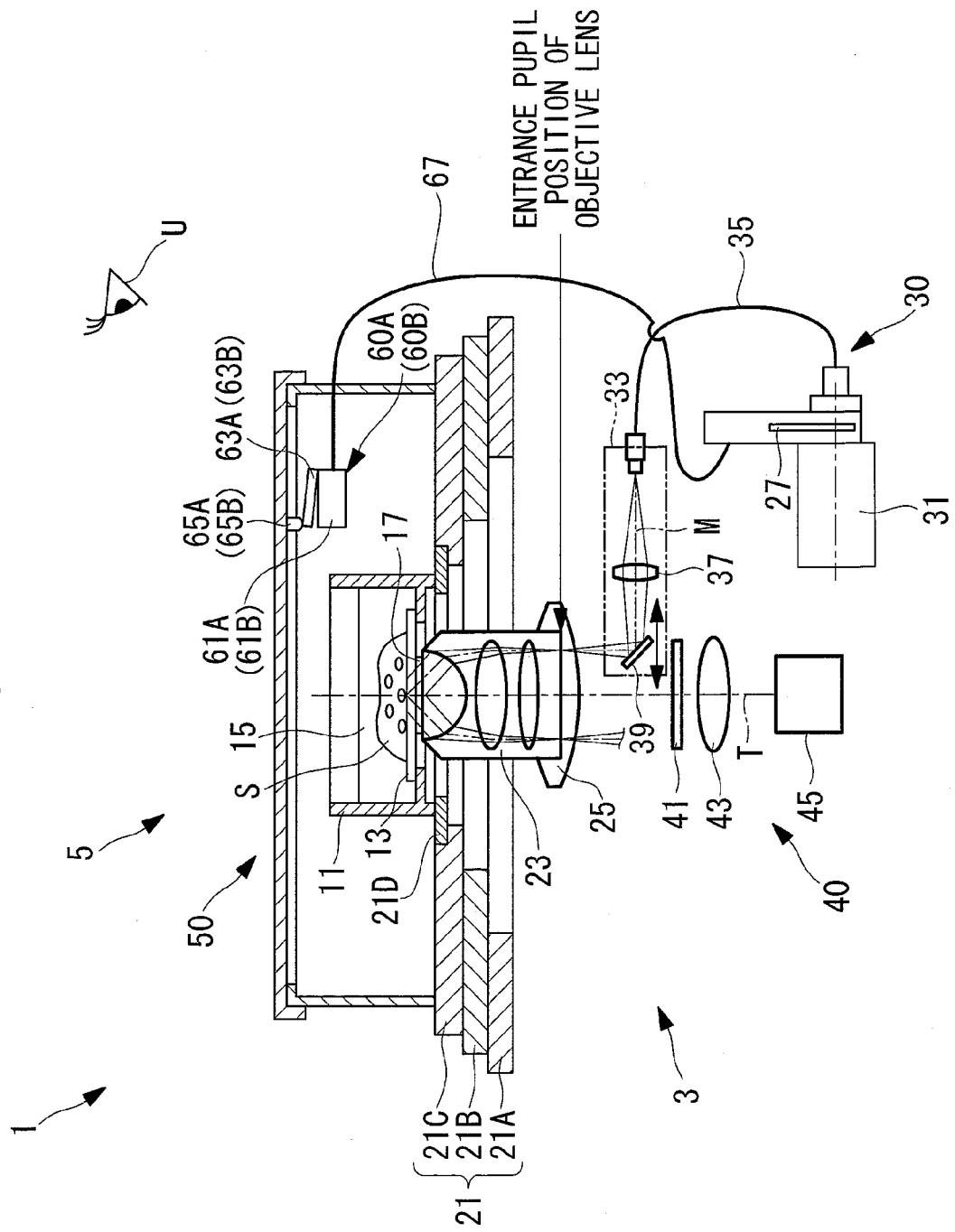
FIG. 1 is a diagram showing, in outline, the configuration of a protection device and a microscope system according to an embodiment of the present invention.

A protection device and a microscope system according to an embodiment of the present invention will be described below with reference to the drawings.

A microscope system 1 according to this embodiment is provided with a microscope main unit (total-reflection illumination microscope) 3 for observing a specimen S and a protection device 5 that is attached to the microscope main unit 3 and prevents laser light from escaping.

The microscope main unit 3 is provided with a stage 21 on which a dish 11 accommodating a specimen S is placed; an objective lens 23 that is disposed below the stage 21; a revolver 25 that holds the objective lens 23; a total-reflection illumination optical system 30 that performs total-reflection illumination of the specimen S via the objective lens 23; a shutter (blocking portion) 27 that can block the entry of laser light from the total-reflection illumination optical system 30 into the objective lens 23; and an observation optical system 40 for observing the specimen S via the objective lens 23.

The dish 11 is made of, for example, a transparent plastic, and has a cover glass 13 that closes an opening created by cutting out the bottom thereof. The specimen S is cultured on the upper surface of the cover glass 13. The interior of the dish 11 is filled with a culturing liquid 15. Oil 17 is filled between the distal end of the objective lens 23 and the cover glass 13.

The stage 21 is provided with a stage securing portion 21A, a bottom stage portion 21B that is connected to the stage securing portion 21A via a ball guide mechanism (not shown) or the like, and a top stage portion 21C that is connected to the bottom stage portion 21B via a ball guide mechanism (not shown) or the like and that supports the dish 11, and the stage 21 is formed by disposing the stage securing portion 21A, the bottom stage portion 21B, and the top stage portion 21C in a stacked state in the plate thickness direction thereof.

An opening is provided at the center portion of the top stage portion 21C so as to open in the thickness direction thereof, and a stage insert 21D is provided in this opening. The stage insert 21D is disposed so as to be movable in a plane perpendicular to an optical axis T of the objective lens 23. The dish 11 is placed on the stage insert 21D.

The top stage portion 21C is provided so as to be movable in a plane perpendicular to the optical axis T of the objective lens 23 and in the direction away from a user U (horizontal direction in the plane of FIG. 1).

The bottom stage portion 21B is provided so as to be movable in a plane perpendicular to the optical axis T of the objective lens 23 and in the left-to-right direction relative to the user U (vertical direction in the plane of FIG. 1).

The objective lens 23 is held by the revolver 25 so as to be disposed facing the specimen S on the stage 21, with the stage 21 positioned therebetween. This objective lens 23 is configured so that observation light, such as fluorescence, from the specimen S can be collected while radiating laser light onto the specimen S.

The revolver 25 is configured so as to be movable in the direction of the optical axis T of the objective lens 23 by means of a focusing mechanism (not shown) so that the objective lens 23 can be moved along this optical axis T.

The total-reflection illumination optical system 30 is provided with a laser head 31 that generates laser light, a light-relaying tube 33 that makes the laser light emitted from the laser head 31 enter the objective lens 23, and an optical fiber 35 that connects the laser head 31 and the light-relaying tube 33 and that guides the laser light emitted from the laser head 31 to the light-relaying tube 33.

The light-relaying tube 33 is provided with a focusing lens 37 that focuses the laser light guided thereto by the optical fiber 35 at a rear-side focal position of the objective lens 23, and a reflecting mirror 39 that reflects the laser light that has passed through the focusing lens 37 toward an outer circumferential portion of the objective lens 23. This light-relaying tube 33 is disposed so that an optical axis M thereof is orthogonal to the optical axis T of the objective lens 23.

The reflecting mirror 39 is provided so as to be movable, by means of a linear motion mechanism (not shown), a spring (not shown), and so forth, in the direction of the optical axis M of the light-relaying tube 33 in the vicinity of the outer circumferential portion of the objective lens 23.

With this total-reflection illumination optical system 30, the laser light from the focusing lens 37 can be focused off-axis at an entrance pupil position of the objective lens 23 by adjusting the position of the reflecting mirror 39 in the direction of the optical axis M of the light-relaying tube 33. Thus, by focusing the laser light off-axis at the entrance pupil position of the objective lens 23, that laser light is made to exit from the objective lens 23 toward the specimen S at a predetermined angle and irradiates a boundary position between the specimen S and the cover glass 13 so as to cause total reflection at that position.

The shutter 27 is disposed at the exit end of the laser head 31. In addition, the shutter 27 has a drive mechanism (not shown) and is provided so that it can be inserted in and removed from the optical path of the laser light by means of the drive mechanism. Thus, the shutter 27 is configured so that it can open the optical path by being retracted from the optical path of the laser light and so that it can block the laser light by being placed in the optical path of the laser light.

The observation optical system 40 is provided with an emission filter 41 that removes unwanted light from the fluorescence collected by the objective lens 23, an image-forming lens 43 that forms an image by focusing the fluorescence that has passed through the emission filter 41, and a CCD camera 45 that acquires an image of the specimen S by capturing the fluorescence focused by the image-forming lens 43.

The protection device 5 is provided with a cover member 50 that is disposed on the stage 21 so as to cover the specimen S, that has a substantially box shape, and that can be opened and closed, and two open/close sensors 60A and 60B that detect the open/close state of the cover member 50.

Figure 2:
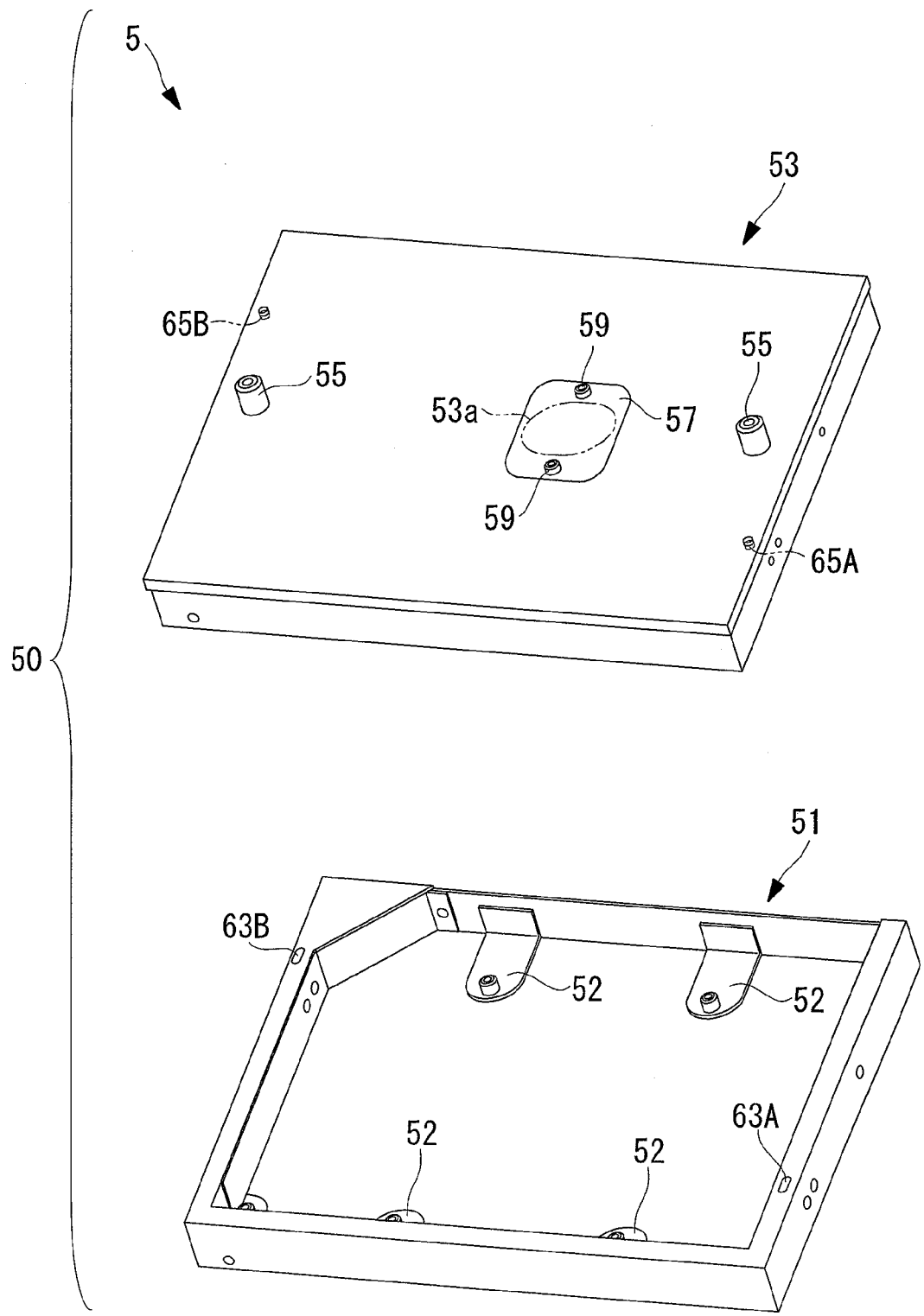
FIG. 2 is a perspective view separately showing a cover main unit and a lid portion of a cover member in FIG. 1.

As shown in FIG. 2, the cover member 50 is provided with a cover main unit 51 that forms side walls thereof and a lid portion 53 that is attached to the cover main unit 51 and that closes one of the openings of the cover main unit 51.

The cover main unit 51 and the lid portion 53 are both formed of a metal material such as aluminum or the like.

The cover main unit 51 is disposed on the top stage portion 21C so as to surround the periphery of the dish 11 with the opening at the top. In addition, the cover main unit 51 has four screw portions 52 for securing it on the top stage portion 21C, allowing it to be secured on the top stage portion 21C by means of screwing.

The lid portion 53 is provided at the opening of the cover main unit 51 so that the lid portion 53 can be opened and closed; it is possible to close the opening of the cover main unit 51 by closing (attaching) the lid portion 53; and it is possible to open the opening of the cover main unit 51 by opening (removing) the lid portion 53. This lid portion 53 is provided with two handles 55 that a user holds when opening and closing the lid portion 53, an opening 53a formed by a through-hole that penetrates the lid portion 53 in the thickness direction thereof, and a closing member 57 that can be opened and closed and that closes the opening 53a.

Figure 3:
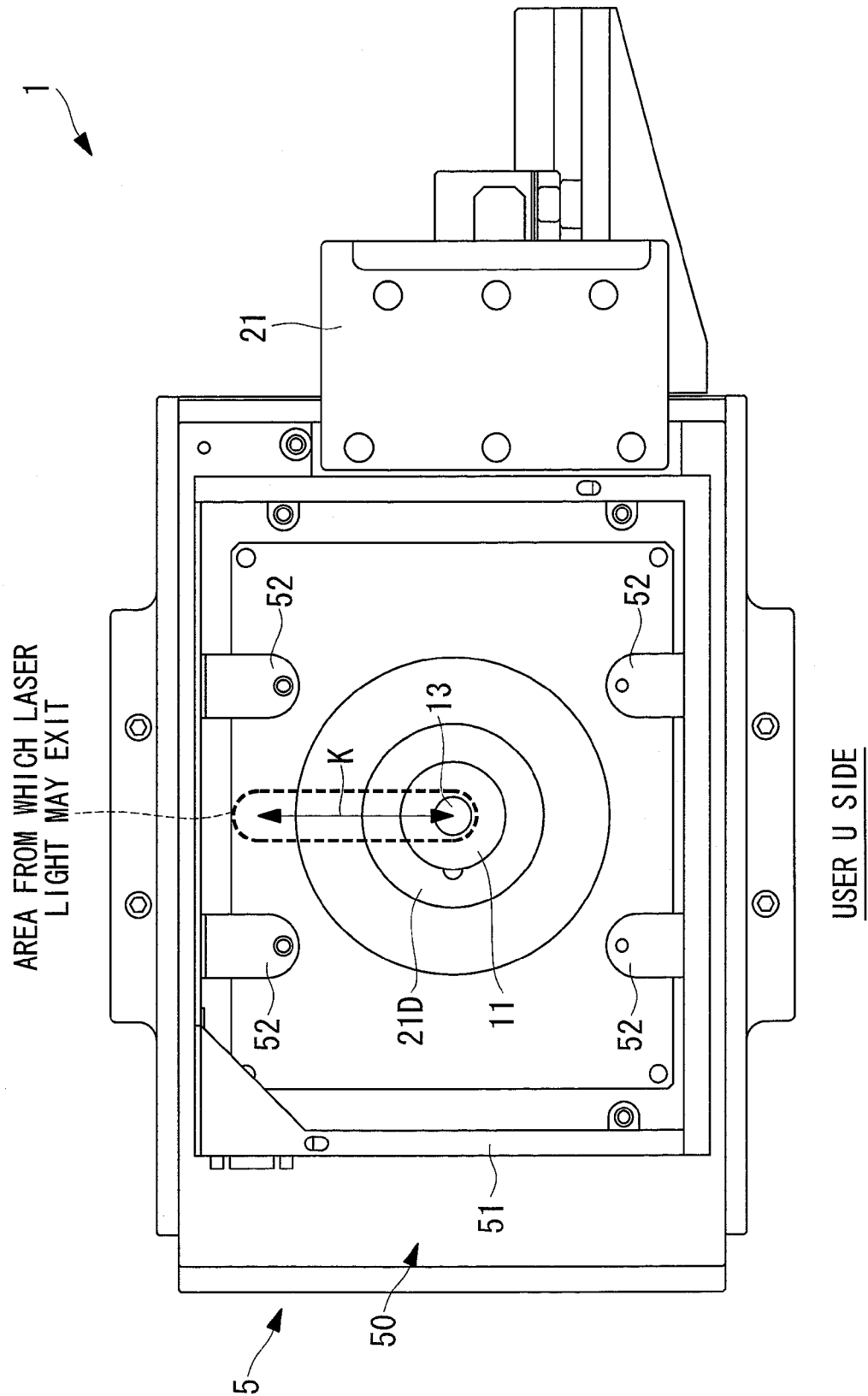
FIG. 3 is a plan view in which the microscope system in FIG. 1 is viewed from a protection device side along the optical axis direction of an objective lens in a state in which the cover member of the protection device is open.

For example, as shown in FIGS. 3 and 4, in the state in which the lid portion 53 is attached to the cover main unit 51 (closed state), the opening 53a of the lid portion 53 is disposed at a position away from the track along the optical path of the laser light that has been focused by the total-reflection illumination optical system 30 and that has passed through the specimen S. In FIG. 3, an arrow K indicates the track along the optical path of the laser light in accordance with the position adjustment of the reflecting mirror 39.

Specifically, in the state in which the lid portion 53 is attached to the cover main unit 51, the opening 53a at the lid portion 53 is disposed at a position that is away from the observation optical axis at least by a distance that satisfies the Expression below in a direction that intersects the track along the optical path of laser light when the optical axis of the laser light is tilted in order to make evanescent light enter the specimen S by means of the total-reflection illumination optical system 30:

(area that can be illuminated with laser light)/2.

Here, the above-described "area that can be illuminated with laser light", that is to say, the length in the direction that is orthogonal to the track along the optical path of the laser light (in FIGS. 3 and 4, the widthwise dimension of an area surrounded by a broken line as an area from which laser light may exit), is equal to, for example, "(movement amount of the stage)+(beam diameter of laser light to be radiated)" in the case in which a region to be irradiated with laser light is adjusted by moving the stage 21. However, because the area in which laser light can be radiated onto the specimen S is restricted by the shapes of members disposed between the objective lens 23 and the specimen S, such as the stage insert 21D, the bottom portion of a dish (cover glass 13), and so forth, the "stage movement amount (movement amount allowed for adjusting the irradiation region)" is a movement amount that takes account of this restriction.

In this embodiment, the opening 53a is disposed at a position shifted from the center of the stage insert 21D, which is provided at the center portion of the top stage portion 21C, toward the right hand side when viewed from the user U. Note that the lid portion 53 is configured so that it can be attached to the cover main unit 51 by changing the orientation thereof so as to place the opening 53a at a position that is shifted from the center of the stage insert 21D toward the left hand side when viewed from the user U.

The closing member 57 is configured so that it can close the opening 53a of the lid portion 53 from outside the cover member 50. In addition, the closing member 57 is configured so that it can be secured to the lid portion 53 by screws 59 in the state in which the opening 53a is closed.

The open/close sensors 60A and 60B are provided with interlock switches (hereinafter simply referred to as "switches") 61A and 61B that output drive signals, levers 63A and 63B that switch ON/OFF the switches 61A and 61B, and protruding interlock pins (hereinafter, simply referred to as "pins") 65A and 65B for pushing in the levers 63A and 63B.

The switches 61A and 61B are individually secured to opposing wall portions of the cover main unit 51 and are connected to the shutter 27 by the cables 67. When switched to the ON state by the levers 63A and 63B, these switches 61A and 61B detect the closed state of the cover member 50 and input the ON signals to the shutter 27, and, when switched to the OFF state, the switches 61A and 61B detect the open state of the cover member 50 and stop inputting the ON signals to the shutter 27.

When the ON signals are input to the shutter 27 at the same time by the two switches 61A and 61B, the shutter 27 is removed from the optical path of the laser light, and the shutter 27 is placed in the optical path of the laser light if even just one of the switches 61A and 61B stops inputting the ON signals to the shutter 27.

The levers 63A and 63B are individually disposed at top-end surfaces of the opposing wall portions of the cover main unit 51. When these levers 63A and 63B are pushed in by the pins 65A and 65B, the switches 61A and 61B are switched to the ON state, and the switches 61A and 61B are switched to the OFF state when the pushing action by the pins 65A and 65B is released.

The pins 65A and 65B are individually provided on a back surface of the lid portion 53 and are disposed at positions that face the levers 63A and 63B when the lid portion 53 is attached to the cover main unit 51. When the lid portion 53 is attached to the cover member 50, these pins 65A and 65B individually come in contact with the levers 63A and 63B and push in the levers 63A and 63B.

The operation of the thus-configured protection device 5 and microscope system 1 according to this embodiment will now be described.

In order to perform observation of a specimen S with total-reflection illumination by using the microscope system 1 according to this embodiment, first, the screw portions 52 of the cover main unit 51 are secured to the top stage portion 21C by means of screwing.

Next, the dish 11 accommodating the specimen S is placed on the top stage portion 21C, and the lid portion 53 is closed to close the opening of the cover main unit 51. By attaching the cover member 50 to the microscope main unit 3, even if laser light focused by the total-reflection illumination optical system 30 of the microscope main unit 3 passes through the specimen S, it is possible to prevent this laser light from escaping to the outside by using the cover member 50.

By attaching the lid portion 53 to the cover main unit 51, the pins 65A and 65B individually push in the levers 63A and 63B, thus switching the switches 61A and 61B to the ON state. Then, when the two switches 61A and 61B input the ON signals to the shutter 27 at the same time via the cables 67, the shutter 27 is removed from the optical path of the laser light. By doing so, the laser light is allowed to enter the objective lens 23 via the total-reflection illumination optical system 30 of the microscope main unit 3.

When laser light is emitted from the laser head 31 in this state, the laser light passes through the shutter 27 and is guided to the light-relaying tube 33 by the optical fiber 35. The laser light guided to the light-relaying tube 33 is focused by the focusing lens 37 and is reflected by the reflecting mirror 39 toward the outer circumferential portion of the objective lens 23.

The position of the reflecting mirror 39 is adjusted in the direction of the optical axis M of the light-relaying tube 33, and the laser light from the focusing lens 37 is focused off-axis at the entrance pupil position of the objective lens 23. By doing so, the laser light exits from the distal end of the objective lens 23 toward the specimen S at the predetermined angle with respect to the optical axis T, which causes total reflection of the laser light at the interface between the specimen S and the cover glass 13. Accordingly, evanescent light escapes toward the specimen S at this interface, and the evanescent light is made to enter the specimen S.

When fluorescence is generated in the specimen S due to the incident evanescent light, this fluorescence is collected by the objective lens 23, and an image is formed at a light-receiving surface of the CCD camera 45 by the image-forming lens 43 after unnecessary light is removed by the emission filter 41. Then, a two-dimensional image of the specimen S is acquired by capturing that fluorescence with the CCD camera 45. By doing so, a user can observe the specimen S by using the two-dimensional image.

As shown in FIG. 3, with the protection device 5 in this embodiment, when the lid portion 53 of the cover member 50 is opened, the pins 65A and 65B are separated from the levers 63A and 63B, thus switching the switches 61A and 61B to the OFF state. When the switches 61A and 61B are switched to the OFF state, the inputting of the ON signals to the shutter 27 is stopped, and the shutter 27 is placed in the optical path of the laser light.

By doing so, the entry of the laser light into the objective lens 23 via the total-reflection illumination optical system 30 of the microscope main unit 3 is blocked by the shutter 27. Therefore, even if the lid portion 53 is removed during observation with total-reflection illumination, it is possible to prevent the laser light that has passed through the specimen S from escaping to the outside.

As shown in FIG. 4, in this case, because the cover member 50 has the opening 53a in the lid portion 53, it is possible to access the specimen S from outside the cover member 50 via the opening 53a during observation with total-reflection illumination, that is to say, while keeping the lid portion 53 closed. Therefore, by removing the closing member 57 from the opening 53a of the lid portion 53 during observation with total-reflection illumination, it is possible to perform reagent stimulation of the specimen S by inserting a pipette or the like inside the cover member 50 from this opening 53a.

In addition, in the preparation stage of observation with total-reflection illumination, in which the angle at which the laser light enters the specimen S is adjusted by moving the position of the reflecting mirror 39 in the direction of the optical axis M of the light-relaying tube 33, although most of the laser light irradiating the interface between the specimen S and the cover glass 13 from the objective lens 23 ends up passing through the specimen S until a state of total-reflection illumination is achieved, because the opening 53a of the lid portion 53 is not disposed in the track of that laser light, it is possible to prevent the laser light from exiting from the opening 53a to outside the cover member 50.

Furthermore, by keeping the opening 53a of the cover member 50 closed with the closing member 57, it is possible to prevent external light from entering the interior of the cover member 50. Therefore, by closing the opening 53a with the closing member 57 except for when accessing the specimen S via the opening 53a of the cover member 50, the interior of the cover member 50 can be kept dark, thus facilitating observation of the specimen S.

As has been described above, with the protection device 5 and the microscope system 1 according to this embodiment, during observation with total-reflection illumination, it is possible to perform procedures such as reagent stimulation or the like by placing a pipette or the like close to the specimen S from outside the cover member 50 via the opening 53a while keeping the lid portion 53 closed and while preventing the laser light from escaping by using the cover member 50.

Note that, in this embodiment, although the cover member 50 formed of the cover main unit 51 and the lid portion 53 has been described as an example of the cover member, alternatively, a cover member in which a cover main unit and a lid portion are integrally formed may be employed as the cover member.

In this case, the entire cover member should be provided on the stage 21 so that it can be opened and closed, and the open/close sensors 60A and 60B should detect the open and closed states of the entire cover member. In addition, at the position that corresponds to the opening 53a of the lid portion 53, that is to say, when attached to the stage 21, the cover member in this case should have an opening formed at a position away from the track along the optical path of laser light that has been focused by the total-reflection illumination optical system 30 and that has passed through the specimen S.

In addition, in this embodiment, although the shutter 27 that is disposed at the exit end of the laser head 31 has been described as an example of the blocking portion, the blocking portion is not limited to a mechanical unit that is placed in and removed from the optical path of the laser light, and, for example, a blocking member that blocks laser light by switching off the laser head 31 itself may be employed. In addition, an acoustic optical device may be employed, and light adjustment at the laser head 31 itself or an optical quenching portion based on an interferometer or the like may be employed.

REFERENCE SIGNS LIST 1 microscope system
3 microscope main unit (total-reflection illumination microscope)
5 protection device
21 stage
23 objective lens
27 shutter (blocking portion)
30 total-reflection illumination optical system
50 cover member
53a opening
57 closing member
60A, 60B open/close sensor
S specimen

The invention claimed is:

1. A protection device that is attached to a total-reflection illumination microscope, the total-reflection illumination microscope being provided with (i) a total-reflection illumination optical system, which focuses laser light that is off-axis with respect to an optical axis of an objective lens at an entrance pupil position of the objective lens, the objective lens facing a specimen on a stage with the stage positioned therebetween, thus making evanescent light enter the specimen via the objective lens, and (ii) a blocking portion, which is drivable to block entry of the laser light into the objective lens from the total-reflection illumination optical system, the protection device preventing laser light that has been focused by the total-reflection illumination optical system and that has passed through the specimen from escaping, and the protection device comprising:

a cover member that is disposed on the stage so as to cover the specimen and that is openable and closable; and
an open/close sensor that detects open and closed states of the cover member and that outputs a drive signal that causes the blocking portion to block the laser light when the cover member is detected to be in the open state,
wherein the cover member, in the closed state, has an opening provided therein at a position away from a track defined along an area that can be illuminated with the laser light that has been focused by the total-reflection illumination optical system and that has passed through the specimen.

2. The protection device according to claim 1, wherein, when the cover member is in the closed state, the opening is disposed at a position away from an observation optical axis, in a second direction that intersects a first direction along which the track is defined, at least by half of a distance in the second direction of the area that can be illuminated with the laser light when an optical axis of the laser light is tilted in order to make the evanescent light enter the specimen via the total-reflection illumination optical system.

3. The protection device according to claim 1, wherein the cover member is provided with a closing member that closes the opening and that is openable and closable.

4. The protection device according to claim 1, wherein:
the protection device is a component of a microscope system comprising the total-reflection illumination microscope as a microscope main unit thereof; and
the protection device is attached to the microscope main unit.

5. The protection device according to claim 1, wherein the opening is openable while performing total-reflection illumination observation which utilizes the laser light that has been focused by the total-reflection illumination optical system and that has passed through the specimen.

* * * * *